(12) United States Patent
Ikarashi et al.

(10) Patent No.: US 12,115,671 B2
(45) Date of Patent: Oct. 15, 2024

(54) WORKPIECE HOLDING APPARATUS, WORKPIECE HOLDING METHOD, PROGRAM, AND CONTROL APPARATUS

(71) Applicant: TOYOTA JIDOSHA KABUSHIKI KAISHA, Toyota (JP)

(72) Inventors: Jun Ikarashi, Komaki (JP); Tatsuro Mori, Toyota (JP); Yoshiki Nagai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 17/951,462

(22) Filed: Sep. 23, 2022

(65) Prior Publication Data

US 2023/0111819 A1    Apr. 13, 2023

(30) Foreign Application Priority Data

Oct. 13, 2021  (JP) ................................. 2021-168015

(51) Int. Cl.
*B25J 9/16*  (2006.01)
*B23Q 15/12*  (2006.01)

(52) U.S. Cl.
CPC ............ *B25J 9/1664* (2013.01); *B23Q 15/12* (2013.01); *B25J 9/1607* (2013.01)

(58) Field of Classification Search
CPC ...... B25J 9/1664; B25J 9/1607; B25J 9/1697; B23Q 15/12
See application file for complete search history.

(56) References Cited

U.S. PATENT DOCUMENTS

| 2016/0167232 A1 | 6/2016 | Takeshita | |
|---|---|---|---|
| 2019/0160617 A1* | 5/2019 | Wada | B25J 9/1697 |
| 2019/0381670 A1* | 12/2019 | Correll | B25J 15/10 |
| 2020/0078941 A1* | 3/2020 | Oka | B25J 9/1653 |
| 2022/0402133 A1* | 12/2022 | Pidaparthi | B25J 9/1694 |
| 2022/0410381 A1* | 12/2022 | Stoppi | B25J 19/023 |

FOREIGN PATENT DOCUMENTS

| JP | 7-227789 A | 8/1995 |
|---|---|---|
| JP | 2011-161395 A | 8/2011 |
| JP | 2015-024453 A | 2/2015 |
| JP | 2018-144184 A | 9/2018 |
| JP | 2020-40158 A | 3/2020 |

\* cited by examiner

*Primary Examiner* — Kira Nguyen
(74) *Attorney, Agent, or Firm* — Sughrue Mion, PLLC (57) ABSTRACT

To calculate a holding position of a workpiece with high accuracy and place the workpiece in a placement position with high accuracy based on the holding position. A workpiece holding apparatus includes: holding means for holding a workpiece; first information acquisition means for acquiring three-dimensional information of the workpiece held by the holding means; position calculation means for calculating a lowest center point of the workpiece as position information of the workpiece based on the three-dimensional information of the workpiece acquired by the first information acquisition means; and control means for calculating a placement position where the workpiece is to be placed based on the position information of the workpiece calculated by the position calculation means and controlling, based on the placement position, the holding means so as to move the workpiece to the placement position and place the workpiece in the placement position.

11 Claims, 6 Drawing Sheets

WORKPIECE HOLDING APPARATUS, WORKPIECE HOLDING METHOD, PROGRAM, AND CONTROL APPARATUS

CROSS REFERENCE TO RELATED APPLICATIONS

This application is based upon and claims the benefit of priority from Japanese patent application No. 2021-168015, filed on Oct. 13, 2021, the disclosure of which is incorporated herein in its entirety by reference.

BACKGROUND

The present disclosure relates to a workpiece holding apparatus, a workpiece holding method, a program, and a control apparatus for holding and placing a workpiece.

While a hand of a workpiece holding apparatus holds a workpiece, the workpiece holding apparatus captures an image of the held workpiece, performs image processing on the captured image of the workpiece, calculates position information of the workpiece, and places the workpiece based on the calculated position information has been known (see, for example, Japanese Unexamined Patent Application Publication No. 2011-161395).

SUMMARY

In the above workpiece holding apparatus, even when a holding position of the workpiece changes two-dimensionally, the holding position of the workpiece can be calculated by reading an alignment mark of the workpiece. However, for example, when the workpiece is attracted by a magnet or the like and held, the holding position of the workpiece changes three-dimensionally. In this case, there is a possibility that the holding position of the workpiece cannot be calculated with high accuracy by the above method for reading an alignment mark and thus the workpiece cannot be placed with high accuracy in a placement position where the workpiece is to be placed.

The present disclosure has been made to solve such problems, and one of the main objects thereof is to provide an workpiece holding apparatus, a workpiece holding method, a program, and a control apparatus capable of calculating a holding position of a workpiece with high accuracy and placing the workpiece in a placement position with high accuracy based on the holding position.

In order to achieve the above-described object, a first exemplary aspect is a workpiece holding apparatus including:
  holding means for holding a workpiece;
  first information acquisition means for acquiring three-dimensional information of the workpiece held by the holding means;
  position calculation means for calculating a lowest center point of the workpiece as position information of the workpiece based on the three-dimensional information of the workpiece acquired by the first information acquisition means; and
  control means for calculating a placement position where the workpiece is to be placed based on the position information of the workpiece calculated by the position calculation means and controlling, based on the placement position, the holding means so as to move the workpiece to the placement position and place the workpiece in the placement position.

In this aspect, the workpiece holding apparatus may further include second information acquisition means for acquiring three-dimensional information of a placement area where the workpiece is to be placed.

In this aspect, the first information acquisition means may acquire information about a height direction of the workpiece, and
  the control means may change the placement position based on the information about the height direction of the workpiece acquired by the first information acquisition means.

In this aspect, a plurality of spiky projections having different heights are provided in the placement area where the workpiece is to be placed,
  the control means may set a position between the adjacent projections as the placement position of the workpiece, and
  the control means may change the placement position of the workpiece in the placement area based on the information about the height direction of the workpiece acquired by the first information acquisition means.

In this aspect, a length of the projection in a height direction may be set in accordance with a length of the workpiece in the height direction, the workpiece being placed in the placement area.

In order to achieve the above-described object, another exemplary aspect may be a workpiece holding method including:
  acquiring three-dimensional information of a workpiece held by holding means;
  calculating a lowest center point of the workpiece as position information of the workpiece based on the acquired three-dimensional information; and
  calculating a placement position where the workpiece is to be placed based on the calculated position information of the workpiece and controlling, based on the placement position, the holding means so as to move the workpiece to the placement position and place the workpiece in the placement position.

In order to achieve the above-described object, another exemplary aspect may be a program for causing a computer to perform:
  a process of acquiring three-dimensional information of a workpiece held by holding means;
  a process of calculating a lowest center point of the workpiece as position information of the workpiece based on the acquired three-dimensional information; and
  a process of calculating a placement position where the workpiece is to be placed based on the calculated position information of the workpiece and controlling, based on the placement position, the holding means so as to move the workpiece to the placement position and place the workpiece in the placement position.

In order to achieve the above-described object, another exemplary aspect may be a control apparatus including:
  position calculation means for calculating a lowest center point of a workpiece as position information of the workpiece based on three-dimensional information of the workpiece acquired by first information acquisition means; and
  control means for calculating a placement position where the workpiece is to be placed based on the position information of the workpiece calculated by the position calculation means and controlling, based on the placement position, holding means so as to move the workpiece to the placement position and place the workpiece in the placement position.

According to the present disclosure, it is possible to provide a workpiece holding apparatus, a workpiece holding method, a program, and a control apparatus capable of calculating a holding position of a workpiece with high accuracy and placing the workpiece in a placement position with high accuracy based on the holding position.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
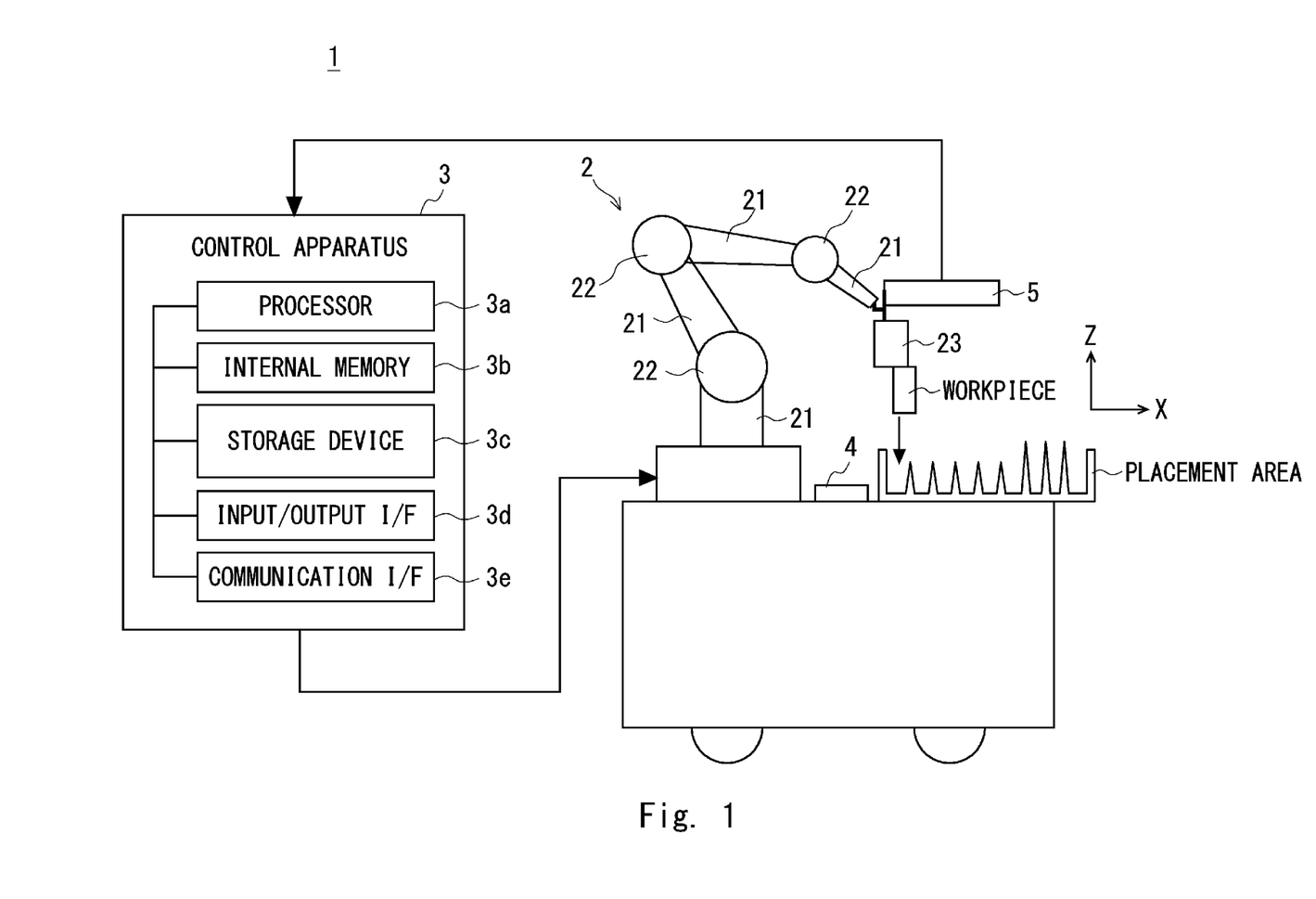
FIG. 1 is a block diagram showing a schematic system configuration of a workpiece holding apparatus according to an embodiment.

An embodiment according to the present disclosure will be described hereinafter with reference to the drawings. FIG. 1 is a block diagram showing a schematic system configuration of a workpiece holding apparatus according to this embodiment. A workpiece holding apparatus 1 according to this embodiment can attract (e.g., suck), hold, and move each workpiece in turn from among a plurality of workpieces placed in a three-dimensional space, and then place each workpiece in a placement area where it is to be placed. The plurality of workpieces are components or the like that are, for example, contained in a box or stacked on a flat surface in a random manner. The placement area of the workpiece (i.e., the placement area where the workpiece is to be placed) is, for example, the inside of a box or the top of a flat plate. Note that the plurality of workpieces includes components having arbitrary shapes, such as a planar shape and a three-dimensional shape.

The workpiece holding apparatus 1 according to this embodiment includes a robot arm 2, a control apparatus 3, a first vision sensor 4, and a second vision sensor 5.

The robot arm 2 is a specific example of holding means. For example, the robot arm 2 is configured as an articulated arm including a plurality of links 21, joint parts (such as a wrist joint, an elbow joint, and a shoulder joint) 22 each of which rotatably connects a corresponding two of the links 21 to each other, and an end effector 23 that is provided at the tip of the arm and attracts (e.g., sucks) and holds a workpiece.

Each of the joint parts 22 is provided with a rotation sensor, such as an encoder, that detects the rotation of that joint part 22, an actuator, such as a servomotor, that drives that joint part 22, and a force sensor that detects an operational force of that joint part 22. The force sensor is, for example, a torque sensor that detects the torque of the joint part 22. Each of the joint parts 22 is provided with a speed-reducing mechanism or the like.

The end effector 23 attracts (e.g., sucks) a workpiece in a non-contact manner, for example, by using an attractive force (e.g., a sucking force) such as a magnetic force or an air pressure, and holds the attracted workpiece. The end effector 23 is configured to, for example, electromagnetically attract a workpiece by generating a magnetic force, and release the electromagnetically-attracted workpiece by stopping the generating of the magnetic force.

The end effector 23 may be configured to grasp a workpiece with a finger part or the like. Note that since the holding position of a workpiece is easily changed three-dimensionally when the end effector 23 is configured to attract a workpiece by a magnetic force or the like, the effect provided by this embodiment that the holding position of the workpiece can be calculated with high accuracy and the workpiece can be placed with high accuracy based on the calculated holding position is increased, which effect will be described later.

The control apparatus 3 performs various arithmetic processes and control processes for the robot arm 2. For example, the control apparatus 3 uses a processor $3a$ such as a CPU (Central Processing Unit) or a GPU (Graphics Processing Unit), an internal memory $3b$ such as a RAM (Random Access Memory) and a ROM (Read Only Memory), a storage device $3c$ such as an HDD (Hard Disk Drive) or an SSD (Solid State Drive), an input/output I/F (InterFace) $3d$ for connecting a peripheral device such as a display, and a communication I/F $3e$ for communicating with an apparatus located outside the control apparatus.

The first vision sensor 4 is a specific example of first information acquisition means. The first vision sensor 4 acquires three-dimensional information of a workpiece held by the end effector 23 of the robot arm 2. The three-dimensional information of each workpiece includes information of the shape of the workpiece, the position (such as three-dimensional coordinates) thereof, the posture thereof, and the like. The first vision sensor 4 is composed of a camera, a laser sensor, or the like.

The first vision sensor 4 is provided between the robot arm 2 and the placement area at substantially the same height position as that of the placement area. Thus, the first vision sensor 4 can acquire three-dimensional information of the workpiece, as viewed from the lower side of the workpiece, held by the end effector 23. Therefore, since a sufficient number of pieces of three-dimensional information of the workpiece can be acquired by only one first vision sensor 4, the number of sensors can be minimized. This leads to a reduction in apparatus costs.

Note that a pair of the first vision sensors 4 may be respectively provided on both sides of the end effector 23 so that they sandwich the end effector 23. By the above structure, more accurate three-dimensional information of the workpiece can be acquired. The first vision sensor 4 outputs the acquired three-dimensional information of the workpiece to the control apparatus 3.

The second vision sensor 5 is a specific example of second information acquisition means. The second vision sensor 5 acquires three-dimensional information of the placement area where the workpiece is to be placed. The three-dimensional information of the placement area includes information of the shape and the position (such as three-dimensional coordinates) of the placement area, the shape and the position of the workpiece placed in the placement area, and the like.

The second vision sensor 5 is disposed, for example, in the end effector 23 or the link 21 (e.g., one of the links 21) of the robot arm 2. The second vision sensor 5 is composed of a camera, a laser sensor, or the like. The second vision sensor 5 outputs the acquired three-dimensional information of the placement area to the control apparatus 3.

Conventionally, when a workpiece is held, the holding position of the workpiece may change three-dimensionally. In this case, for example, there is a possibility that the holding position of the workpiece cannot be calculated with high accuracy and thus the workpiece cannot be placed in a placement position with high accuracy.

To cope with the above problem, the workpiece holding apparatus 1 according to this embodiment acquires by the first vision sensor 4 three-dimensional information of the workpiece held by the robot arm 2, calculates a lowest center point of the workpiece as position information of the workpiece based on the acquired three-dimensional information of the workpiece, and calculates a placement position where the workpiece is to be placed based on the calculated position information of the workpiece.

By doing the above, it is possible to acquire by the first vision sensor 4 three-dimensional information of the workpiece held by the robot arm 2, calculate a lowest center point of the workpiece as position information of the workpiece with high accuracy based on the acquired three-dimensional information of the workpiece, and place the workpiece in the placement position with high accuracy based on the position information of the workpiece. That is, it is possible to calculate a holding position of a workpiece with high accuracy and place the workpiece in the placement position with high accuracy based on the holding position.

Figure 2:
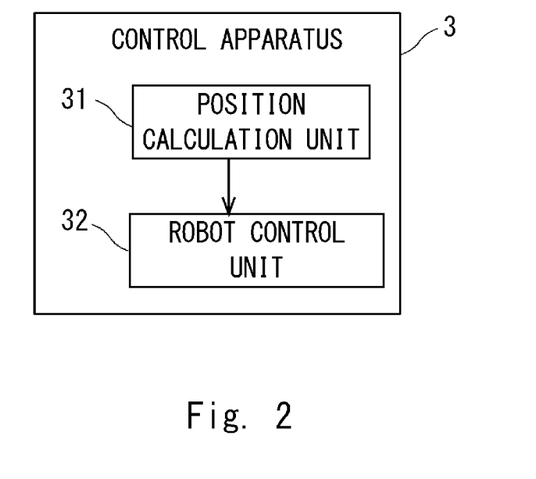
FIG. 2 is a block diagram showing a schematic system configuration of a control apparatus according to the embodiment.

FIG. 2 is a block diagram showing a schematic system configuration of a control apparatus according to this embodiment. The control apparatus 3 according to this embodiment includes a position calculation unit 31 and a robot control unit 32.

The position calculation unit 31 is a specific example of position calculation means. The position calculation unit 31 calculates position information of a workpiece based on three-dimensional information of the workpiece acquired by the first vision sensor 4. The position calculation unit 31 may calculate a position of the lowest center point of the workpiece as position information of the workpiece based on the three-dimensional information of the workpiece acquired by the first vision sensor 4.

Figure 3:
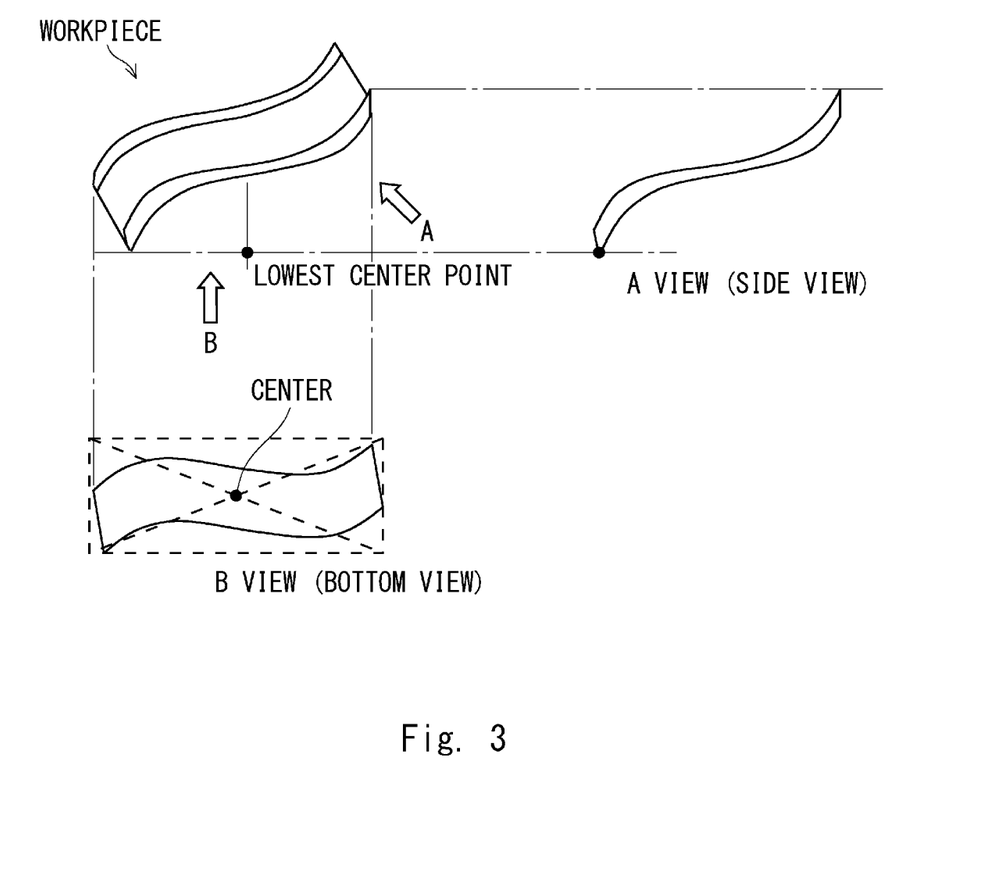
FIG. 3 is a diagram showing a position of the lowest center point of a workpiece.

For example, as shown in FIG. 3, the position of the lowest center point of the workpiece is a position where the center point (the center of the figure) of the workpiece in a bottom view in which the workpiece is viewed from a lower side thereof is shifted to the height of the lowest point of the workpiece in a side view in which the workpiece is viewed from the side thereof. By calculating the position of the lowest center point of the workpiece as the position information of the workpiece, the workpiece can be grasped at the lowest and center point of the workpiece where the workpiece is stabilized when it is placed in the placement position.

For example, the position calculation unit 31 acquires a three-dimensional point cloud of the workpiece from an image of the workpiece acquired by the first vision sensor 4. The position calculation unit 31 calculates the lowest point of the workpiece and the center point of the workpiece based on the three-dimensional point cloud of the workpiece. The position calculation unit 31 calculates a point obtained by shifting the calculated center point of the workpiece to the height of the lowest point of the workpiece as the position of the lowest center point of the workpiece.

The robot control unit 32 is a specific example of control means. The robot control unit 32 calculates a placement position of the workpiece held by the robot arm 2 based on the position information of the workpiece calculated by the position calculation unit 31. The robot control unit 32 moves the workpiece to the placement position and places it there by controlling the robot arm 2.

As shown in FIG. 1, a plurality of spiky projections may be provided in the placement area of the workpiece. By the above structure, the workpiece can be reliably prevented from falling over by placing the workpiece between adjacent projections. The projections are provided, for example, at equal intervals in the XY direction. Each projection is formed so as to have a spiky shape in which the tip thereof is sharp. However, for example, the tip of each projection may be rounded, or each projection may have any shape by which the workpiece can be held between adjacent projections and thus prevented from falling over.

The robot control unit 32 calculates, for example, a center between adjacent projections and a height position of the tip of each of the projections as the placement position based on the three-dimensional information of the workpiece acquired by the second vision sensor 5.

Figure 4:
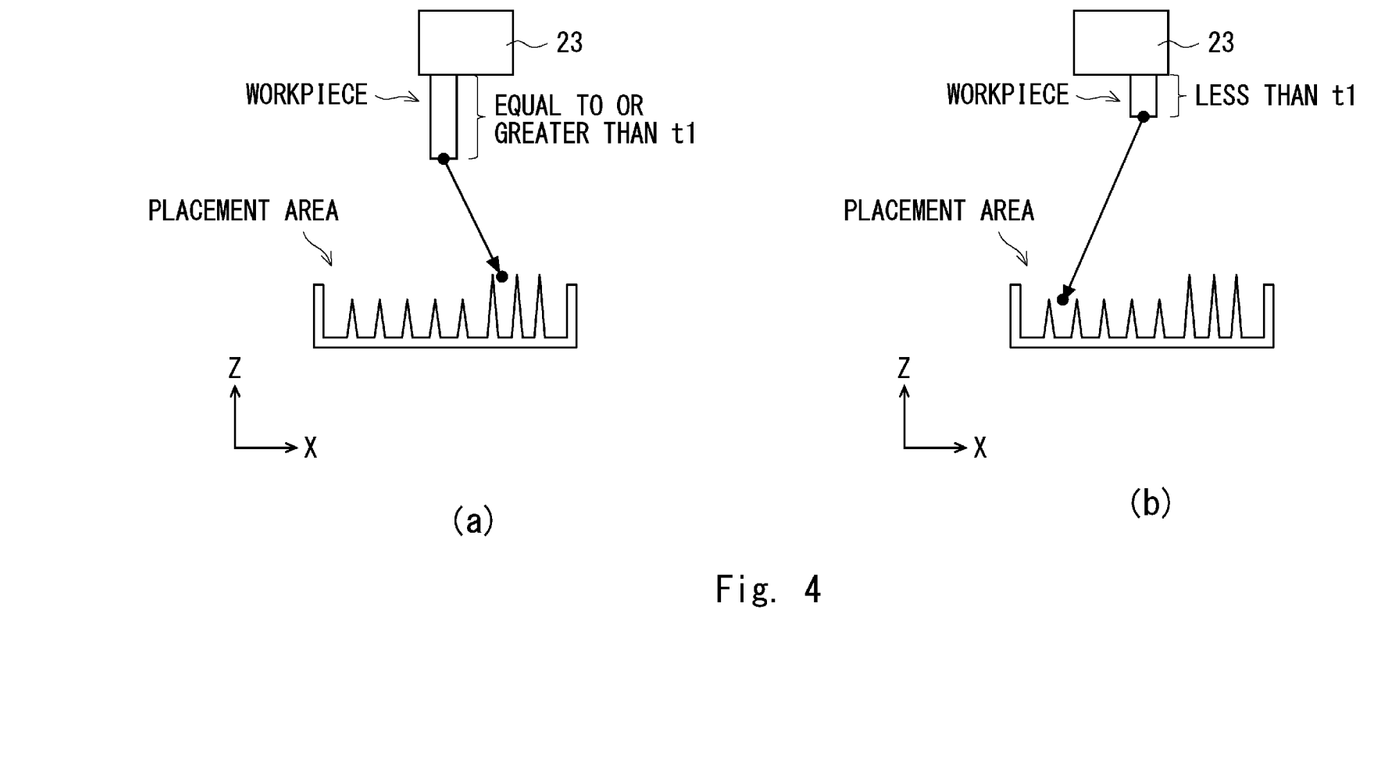
FIG. 4 is a diagram showing a placement position of a workpiece in accordance with a length of the workpiece in the height direction.

The first vision sensor 4 acquires information about the height direction (Z direction) of the workpiece as three-dimensional information of the workpiece. As shown in FIG. 4, the information about the height direction of the workpiece is, for example, a length of the workpiece held by the end effector 23 in the height direction.

The robot control unit 32 changes the placement position of the workpiece in the placement area based on the information about the height direction of the workpiece acquired by the first vision sensor 4. In general, when the workpiece is placed in the placement area, the longer the length of the workpiece in the height direction is, the more easily the workpiece falls over. As described above, the ease with which the workpiece falls over when the workpiece is placed varies according to the length of the workpiece in the height direction. Therefore, the placement position can be changed to a position where the workpiece is less likely to fall over in accordance with the information about the height direction of the workpiece, and thus the workpiece can be more reliably prevented from falling over.

As shown in FIG. 1, a plurality of spiky projections having different heights may be provided in the placement area. For example, projections that are short in the height direction and projections that are long in the height direction are provided in the placement area. The second vision sensor 5 acquires information of the positions of the long and the short projections in the placement area and the like as three-dimensional information of the placement area, and outputs it to the robot control unit 32.

The robot control unit 32 may determine whether or not the length of the workpiece in the height direction is equal to or greater than a predetermined value t1 based on the information about the height direction of the workpiece acquired by the first vision sensor 4. As shown in FIG. 4(*a*), when the robot control unit 32 determines that the length of the workpiece in the height direction is equal to or greater than the predetermined value t1, the robot control unit 32 sets a position between the projections that are long in the height direction as the placement position of the workpiece. By doing so, the workpiece that is long in the height direction is sandwiched between the projections that are long in the height direction and thus the workpiece that is long in the height direction is prevented from falling over.

On the other hand, as shown in FIG. 4(b), when the robot control unit 32 determines that the length of the workpiece in the height direction is less than the predetermined value t1, the robot control unit 32 sets a position between the projections that are short in the height direction as the placement position of the workpiece. By doing so, the workpiece that is short in the height direction is sandwiched between the projections that are short in the height direction and thus the workpiece that is short in the height direction is prevented from falling over. The predetermined value t1 may be set in the robot control unit 32. The predetermined value t1 is set, for example, based on the length of the projection in the height direction.

The length of the projection in the height direction may be set in accordance with the length of the workpiece in the height direction, the workpiece being placed on the placement area. By doing so, it is possible to more reliably prevent the workpiece placed between the projections from falling over. For example, when three workpieces having different lengths in the height direction are placed in the placement area, the lengths of three projections in the height direction may be set in accordance with the lengths of the three workpieces in the height direction. As described above, any number of different lengths of the projections in the height direction may be used, and any number of different lengths of the workpieces in the height direction, which workpieces are placed in the placement area, may be used.

The robot control unit 32 may change the placement position in the placement area based on information about the horizontal direction (X direction) of the workpiece acquired by the first vision sensor 4. For example, when the robot control unit 32 determines that the length of the workpiece in the horizontal direction is longer than a predetermined value t2, the robot control unit 32 sets a position where no projection is provided as the placement position of the workpiece. As described above, when the workpiece is long in the horizontal direction and thus is less likely to fall over, it is possible to set a position where no projection is provided as the placement position of the workpiece and therefore increase the number of possible placement positions of the workpiece.

The robot control unit 32 may change the placement position of the workpiece in the placement area based on the information about the height direction and the horizontal direction of the workpiece acquired by the first vision sensor 4. For example, when the robot control unit 32 determines that the length of the workpiece in the height direction is equal to or greater than the predetermined value t1 and the length of the same in the horizontal direction is equal to or greater than the predetermined value t2, the robot control unit 32 sets a position between the projections that are short in the height direction as the placement position of the workpiece. As described above, when the workpiece is long in the horizontal direction even though it is also long in the height direction, this workpiece is less likely to fall over. Therefore, the workpiece that is long in the height direction may be disposed so that it is sandwiched between the projections that are short in the height direction.

Further, the robot control unit 32 sets a position where the workpiece does not interfere with another workpiece that is already placed in the placement area as the placement position of the workpiece based on the three-dimensional information of the placement area acquired by the second vision sensor 5.

As described above, after the workpiece is placed in the placement area, the second vision sensor 5 acquires three-dimensional information of the placement area, and outputs the acquired three-dimensional information of the placement area to the robot control unit 32.

Figure 5:
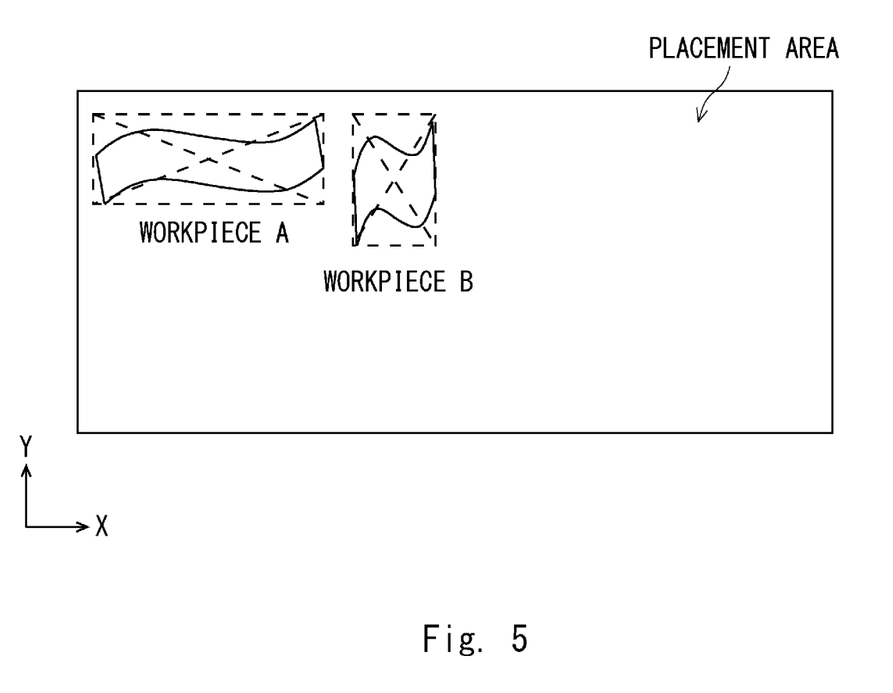
FIG. 5 is a diagram showing outer regions of other workpieces that are already placed in a placement area.

For example, as shown in FIG. 5, the robot control unit 32 acquires a three-dimensional point cloud of workpieces A and B that are already placed in the placement area based on the three-dimensional information of the placement area from the second vision sensor 5, and calculates an outer region (dotted line) of each of the workpieces A and B based on the acquired three-dimensional point cloud.

When a new workpiece is placed in the placement area, the robot control unit 32 sets the placement position of the workpiece so as to avoid the outer regions of the workpieces A and B in the placement area. By doing so, it is possible to set a position where the workpiece does not interfere with other workpieces A and B that are already placed in the placement area as the placement position of the workpiece.

Figure 6:
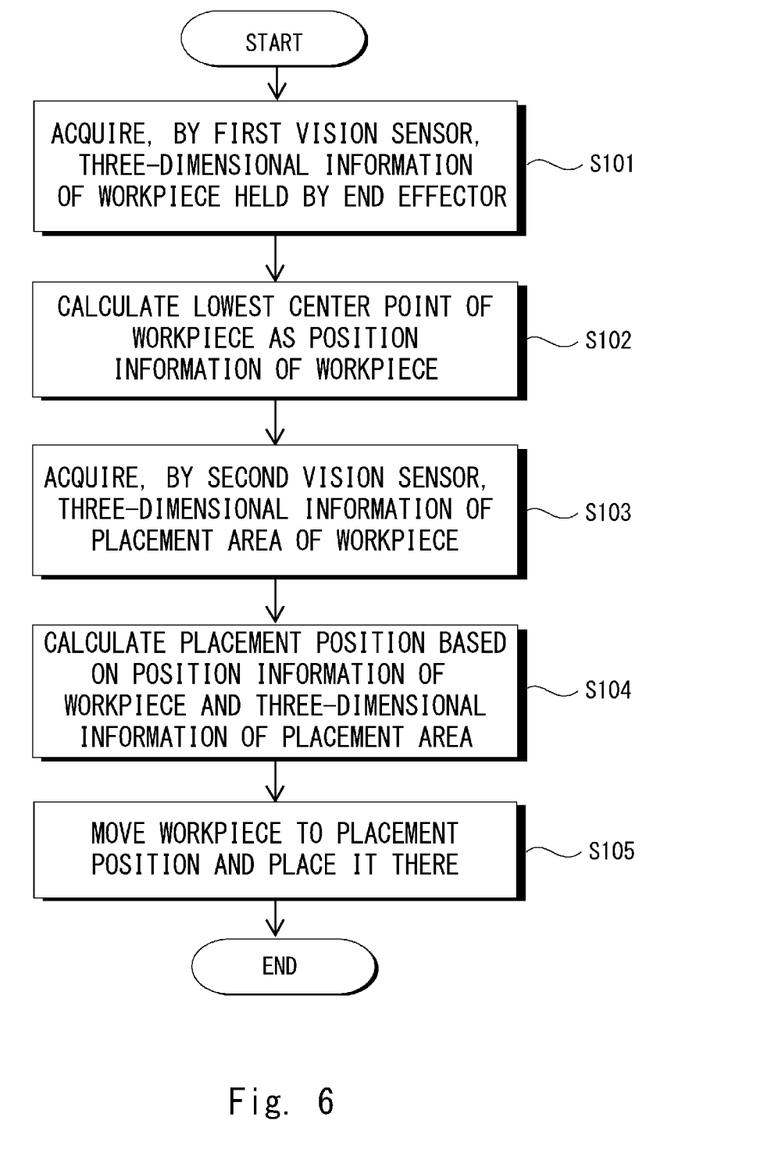
FIG. 6 is a flowchart showing a flow of processes performed by a method for holding a workpiece according to the embodiment.

Next, a method for holding a workpiece according to this embodiment will be described. FIG. 6 is a flowchart showing a flow of processes performed by the method for holding a workpiece according to this embodiment. Note that the processes shown in FIG. 6 may be repeated at intervals of a predetermined time.

The first vision sensor 4 acquires three-dimensional information of a workpiece held by the end effector 23 of the robot arm 2, and outputs the acquired three-dimensional information of the workpiece to the position calculation unit 31 of the control apparatus 3 (Step S101).

The position calculation unit 31 calculates the lowest center point of the workpiece as position information of the workpiece based on the three-dimensional information of the workpiece acquired by the first vision sensor 4, and outputs the calculated position information of the workpiece to the robot control unit 32 (Step S102).

The second vision sensor 5 acquires three-dimensional information of a placement area of the workpiece, and outputs the acquired three-dimensional information of the placement area to the robot control unit 32 (Step S103).

The robot control unit 32 calculates a placement position where the workpiece is to be placed based on the position information of the workpiece calculated by the position calculation unit 31 and the three-dimensional information of the placement area acquired by the second vision sensor 5 (Step S104).

The robot control unit 32 controls, based on the calculated placement position, the robot arm 2 so as to move the workpiece to the placement position and place it there (Step S105).

As described above, the workpiece holding apparatus 1 according to this embodiment acquires by the first vision sensor 4 three-dimensional information of the workpiece held by the robot arm 2, calculates a lowest center point of the workpiece as position information of the workpiece based on the acquired three-dimensional information of the workpiece, and calculates a placement position where the workpiece is to be placed based on the calculated position information of the workpiece.

By doing the above, it is possible to calculate a lowest center point of the workpiece as position information of the workpiece with high accuracy based on the three-dimensional information of the workpiece acquired by the first vision sensor 4, and place the workpiece with high accuracy based on the position information of the workpiece. That is, it is possible to calculate a holding position of a workpiece with high accuracy and place the workpiece on a position where the workpiece is to be placed with high accuracy based on the holding position.

Several novel embodiments according to the present disclosure have been described above. However, these embodiments are merely presented as examples and are not intended to limit the scope of the disclosure. These novel embodiments can be implemented in various forms. Further, their components/structures may be omitted, replaced, or modified without departing from the scope and the spirit of the disclosure. These embodiments and modifications thereof are included in the scope and the spirit of the disclosure and also included in the disclosure specified in the claims and the scope equivalent thereto.

The present disclosure may also be implemented, for example, by having a processor execute a computer program and thereby perform the processes shown in FIG. 6.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices.

The program may be provided to a computer using any type of transitory computer readable media. Examples of transitory computer readable media include electric signals, optical signals, and electromagnetic waves. Transitory computer readable media can provide the program to a computer through a wired communication line (e.g., electric wires, and optical fibers) or a wireless communication line.

Each of the units constituting the control apparatus 3 according to any of the above-described embodiments is, in addition to being able to be implemented by the program, able to be partially or entirely implemented by dedicated hardware such as an ASIC (Application Specific Integrated Circuit) or an FPGA (Field-Programmable Gate Array).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A workpiece holding apparatus comprising:
   holding means for holding a workpiece;
   first information acquisition means for acquiring three-dimensional information of the workpiece held by the holding means;
   position calculation means for calculating a lowest center point of the workpiece as position information of the workpiece based on the three-dimensional information of the workpiece acquired by the first information acquisition means; and
   control means for calculating a placement position where the workpiece is to be placed based on the position information of the workpiece calculated by the position calculation means and controlling, based on the placement position, the holding means so as to move the workpiece to the placement position and place the workpiece in the placement position, wherein
   the first information acquisition means acquires information about a height direction of the workpiece,
   the control means changes the placement position based on the information about the height direction of the workpiece acquired by the first information acquisition means,
   a plurality of spiky projections having different heights are provided in a placement area where the workpiece is to be placed,
   the control means sets a position between the adjacent projections as the placement position of the workpiece, and
   the control means changes the placement position of the workpiece in the placement area based on the information about the height direction of the workpiece acquired by the first information acquisition means.

2. The workpiece holding apparatus according to claim 1, further comprising second information acquisition means for acquiring three-dimensional information of a placement area where the workpiece is to be placed.

3. The workpiece holding apparatus according to claim 1, wherein a length of the projection in a height direction is set in accordance with a length of the workpiece in the height direction, the workpiece being placed in the placement area.

4. A workpiece holding method comprising:
   acquiring three-dimensional information of a workpiece held by holding means;
   calculating a lowest center point of the workpiece as position information of the workpiece based on the acquired three-dimensional information; and
   calculating a placement position where the workpiece is to be placed based on the calculated position information of the workpiece and
   the acquiring step acquires information about a height direction of the workpiece;
   the controlling step changes the placement position based on the acquired information about the height direction of the workpiece,
   a plurality of spiky projections having different heights are provided in a placement area where the workpiece is to be placed,
   the controlling step sets a position between the adjacent projections as the placement position of the workpiece, and
   the controlling step changes the placement position of the workpiece in the placement area based on the acquired information about the height direction of the workpiece.

5. The workpiece holding method according to claim 4, wherein a length of the projection in a height direction is set in accordance with a length of the workpiece in the height direction, the workpiece being placed in a placement area.

6. A non-transitory computer readable medium storing a program for causing a computer to perform:
   a process of acquiring three-dimensional information of a workpiece held by holding means;
   a process of calculating a lowest center point of the workpiece as position information of the workpiece based on the acquired three-dimensional information;
   a process of calculating a placement position where the workpiece is to be placed based on the calculated position information of the workpiece and controlling, based on the placement position, the holding means so as to move the workpiece to the placement position and place the workpiece in the placement position, a process of acquiring information about a height direction of the workpiece, and a process of changing the placement position based on the acquired information about the height direction of the workpiece, a process of providing a plurality of spiky projections having different heights in a placement area where the workpiece is to be placed, a process of setting a position between the adjacent projections as the placement position of the workpiece, and a process of changing the placement position of the workpiece in the placement area based on the acquired information about the height direction of the workpiece.

7. The non-transitory computer readable medium storing program according to claim 6, further comprising a process of acquiring three-dimensional information of a placement area where the workpiece is to be placed.

8. The non-transitory computer readable medium storing program according to claim 6, wherein a length of the projection in a height direction is set in accordance with a length of the workpiece in the height direction, the workpiece being placed in a placement area.

9. A workpiece holding apparatus comprising:

a holder configured to hold a workpiece;

a first information acquisition unit configured to acquire three-dimensional information of the workpiece held by the holder;

a calculator configured to calculate a lowest center point of the workpiece as position information of the workpiece based on the three-dimensional information of the workpiece acquired by the first information acquisition unit; and a controller configured to calculate a placement position where the workpiece is to be placed based on the position information of the workpiece calculated by the calculator and controlling, based on the placement position, the holding means so as to move the workpiece to the placement position and place the workpiece in the placement position, wherein the first information acquisition unit acquires information about a height direction of the workpiece, the controller changes the placement position based on the information about the height direction of the workpiece acquired by the first information acquisition means, a plurality of spiky projections having different heights are provided in a placement area where the workpiece is to be placed, the controller sets a position between the adjacent projections as the placement position of the workpiece, and change the placement position of the workpiece in the placement area based on the acquired information about the height direction of the workpiece.

10. The workpiece holding apparatus according to claim 9, further comprising second information acquisition means for acquiring three-dimensional information of a placement are where the workpiece is to be placed.

11. The workpiece holding apparatus according to claim 9, wherein a length of the projection in a height direction is set in accordance with a length of the workpiece in the height direction, the workpiece being placed in a placement area.

\* \* \* \* \*